March 14, 1961    G. E. KUNKLE    2,974,377
POLYBUTENE SEALING COMPOUND FOR GLAZING PURPOSES
Filed March 10, 1959

INVENTOR.
GERALD E. KUNKLE
BY Oscar L. Spencer
ATTORNEY

United States Patent Office 2,974,377
Patented Mar. 14, 1961

2,974,377
POLYBUTENE SEALING COMPOUND FOR GLAZING PURPOSES

Gerald E. Kunkle, New Kensington, Pa., assignor to Pittsburgh Plate Glass Company, Allegheny County, Pa., a corporation of Pennsylvania Filed Mar. 10, 1959, Ser. No. 798,524

10 Claims. (Cl. 20—56.5)

This invention relates to sealer compositions and it has particular relation to sealer compositions suitable for use in a multiple glazed unit and glazing application.

One object of the invention is to provide a sealer composition which possesses controlled flow properties as well as optimum tensile and elongation characteristics.

A second object of the invention is to provide a sealer composition which exhibits satisfactory adhesion to both glass and metal surfaces after long exposure to extremes of weather. The composition must be able to withstand extremes of temperature, ultraviolet radiation and must be impervious to water vapor.

A further object of the invention is the provision of a pressure-sensitive adhesive sealer composition which is of particular value in the fabrication of multiple glazed units or other glazing structures.

Other objects and advantages of the invention will be apparent from the following detailed description of certain embodiments thereof taken in conjunction with the drawing in which.

Figure 1:
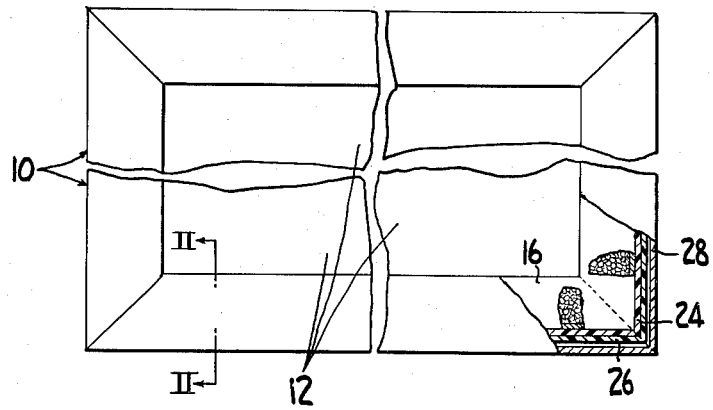
Fig. 1 is a plan view of a multiple glazed unit.

In the drawing a multiple glazed unit 10 is shown. It is comprised of two sheets of glass 12 and 14 separated by a marginal edge spacer element 16 which is in the form of a hollow tube of rectangular cross-section extending completely around the marginal edges of the glass sheets. It is understood that the spacer element may be of a different cross-section or may be solid as desired. The spacer element is preferably made of a metal such as extruded aluminum or steel. It is the usual practice for such spacer element to have a desiccant 17 in the inside thereof. The hollow spacer element 16 is provided with spaced openings 18 connecting the interior 20 of the unit with the desiccant 17 so that moisture from the air within the unit may be absorbed by the dessicant.

The spacer element 16 is adhered to the edges of glass sheets 12 and 14 at their meeting faces by means of a thin, continuous film or strip of sealing compound 22. The final thickness of this strip varies between 0.001 and 0.005 inch. In addition to being between the spacer unit and the glass sheet in their meeting areas, the sealing compound 22 is also provided along the outer edge of the unit overlapping the edges of the glass sheets and spacer elements at 24 so as to provide a continuous, moisture and vapor impervious seal. A moisture and vapor impervious, non-fibrous, reinforcing strip 26 may be wrapped around the sealing compound 24 to give the unit added strength. The strip 26 may be made of polyethylene, butyl rubber or like material.

The channel member 28 of U-shaped cross-section, made of metal such as stainless steel, is affixed around the periphery of the sealed unit. The angle which the integral flanges or sides of the channel member form with the central portion is slightly less than 90°. When the channel member is affixed to the edges of the glass sheets, these sides are held apart to allow the glass sheets to be inserted between the flanges. After insertion of the glass sheets, the sides of the channel member are released and they spring back into contact with the exterior faces of the glass sheets. The channel member is thus held on the edges of the unit under tension, and the glass sheets are pressed against the sealing compound 22 and spacer element 16 so as to maintain a pressure of about 10 to 50 pounds per square inch on the sealing compound, usually about 30 to 35 pounds per square inch.

It can be seen, therefore, that the sealing compound must possess satisfactory flow properties in order to adhere to the spacer element and glass sheets and maintain the desired thickness of material between the spacer element and the glass sheets. If the sealing compound is subject to "cold flow," that is, gradual exudation or movement toward attainment of a common level, the minimum thickness of 0.001 inch cannot be maintained. The compound will be squeezed out from between the spacer element and glass sheets under the pressure caused by the channel member 28. This minimum thickness of sealing compound between the glass sheets and spacer element is required to maintain the seal during flexing of the glass sheets 12 and 14 when the air within the unit expands or contracts due to variations in atmospheric temperature and/or pressure.

Much effort has been expended in a search for more effective sealing compounds since they constitute an essential element of satisfactory units of the type described. Numerous plastic or mastic materials have been tested to evaluate their usefulness as sealing compounds in a multiple glazed unit. Although some of these materials possess good sealing and adhesive characteristics for a multitude of uses, they have been found to be unsatisfactory for use as a sealer in a multiple glazed unit of the type described. This can be understood by realization of the rigid specifications which the sealing compound must conform to.

When a multiple glazed unit is sold to a customer and installed in a building, it is expected that the unit will last for the reasonable life of the building. The life of a building structure such as a home or an office building will vary but an average figure might be considered to be around fifty years. Thus, it can be seen that a multiple glazed unit which is to last for fifty years, during which time it is exposed to many extremes of weather, must be manufactured with a material which is much better than just the average sealing or calking compound.

In order to determine whether various sealing compounds are satisfactory for a multiple glazed unit of the type described, it is necessary to subject the unit to accelerated weathering tests. One such test involves placing a multiple glazed unit in a closed test chamber containing a layer of water at the bottom of the chamber below the unit and gradually changing the temperature within the chamber from 120° F. to 20° F. and returning to 120° F. over a six hour period. This test is repeated continuously over many days, months and years.

Of the many plastic materials available for incorporation in sealer compositions for multiple glazed units, only polyisobutylene exhibits the required characteristics of flexibility, density, water impermeability and adhesiveness. Polyisobutylene, however, is susceptible to "cold flow" and this property naturally precludes its application. Various attempts have been made to control the flow properties of polysibutylene as required for use in a multiple glazed unit as described above and in some instances with good results; however, this has been achieved at the expense of other properties required for use in multiple glazed units as set forth above.

It has now been discovered that a greatly improved sealing compound can be obtained by blending butyl rubber with a polybutene such as polyisobutylene and vulcanizing the mixture to impart to the mixture the desided flow properties, flexibility, density, moisture and vapor impermeability and adhesiveness. The term "butyl rubber" is intended to define rubber-like polymeric substances produced by polymerization of an olefin, for example isobutylene, and a diolefin of the group including butadiene, isoprene, dimethylbutadiene, pentadiene and piperylene, said polymeric substances containing 70 to 99.5 parts by weight of the olefin and 30 to 0.5 part by weight of the diolefin. These copolymers are produced by low temperature polymerization using a solution of aluminum chloride in a low freezing solvent such as ethyl or methyl chloride at temperatures ranging from $-10°$ C. to $-100°$ C. or lower. The polymer thereby produced has a molecular weight between 25,000 and 100,000.

The term "polybutene" is intended to include polymers or copolymers of monoolefins containing four carbon atoms such as isobutylene, butene-1 and butene-2 and mixtures of the polymers and/or copolymers. These polymers or copolymers may be polymers of the pure compounds or may be polymers of unsaturated four carbon atom fractions resulting from petroleum distillations. The polybutenes which have been found to be useful in the practice of the invention are low molecular weight polybutenes having a molecular weight between 300 and 15,000. For example, one embodiment of the invention utilizes polyisobutylene having a molecular weight of about 10,000 to 15,000, whereas another form of the invention utilizes polymers of mixtures of butene-1, butene-2 and isobutylene having molecular weights between 300 to 2,000. It is to be understood, of course, that the flow properties of the mixtures can be altered slightly and remain within the purview of the invention by the use of small amounts of fillers and other modifiers such as hereinafter described.

Various grades of butyl rubber, such as GR–I, GR–I–17, GR–I–14 and GR–I–15, differ in amount of diolefin contained therein and in the rate at which they may be cured. Other grades such as GR–I–40, GR–I–60, and GR–I–80 differ in molecular weight. This nomenclature refers to butyl rubber formerly manufacured by the U.S. Government. The same materials are now manufactured by and are available from private sources by other designations. Manifestly, therefore, the grade of butyl rubber and the amount thereof admixed with the polybutene will be determined by the physical characteristics which are desired in the sealing compound. It is possible for as litte as 45 parts by weight and as much as 210 parts by weight of poybutene to be combined with 100 parts by weight of the buty rubber in vulcanizable compositions which would be useful as sealing compounds in the practice of the present invention. It has been found that when a polybutene such as polyisobutylene having a molecular weight of about 10,000 to 15,000 is employed in combination with butyl rubber having a molecular weight of about 50,000 to 65,000, it is preferred to use about 100 to 210 parts by weight of the polyisobutylene based on 100 parts by weight of the butyl rubber; whereas, when a polybutene such as a polymer of butene-1, butene-2 and isobutylene having a molecular weight of 300 to 2,000 is employed, it is preferred to use lesser amounts, for example about 45 to 65 parts by weight of the polybutene based on 100 parts by weight of butyl rubber. Generally it has been found that the higher the molecular weight of the polybutene, the more of it that is required to obtain the desired properties for the sealer compound. Conversely, the lower the molecular weight of the polybutene within the ranges specified, the less is the amount required with respect to the butyl rubber to provide the mixture with the desired properties.

In the production of the sealing compound, the polybutene and butyl rubber are thoroughly mixed on a suitable mill and then vulcanized by an amount of a vulcanizing agent for the mixture which is sufficient to obtain the desired properties. The amount of vulcanizing agent required is greater as the ratio of the polybutene to butyl rubber becomes greater. The use of paradinitrosobenzene to vulcanize the mixture of polybutene and butyl rubber has been found to be critical for the sealing compounds which are to be used in the double glazed units as described above. The amount of active paradinitrosobenzene curing agent employed ranges from about 0.25 to 1.5 percent by weight of the butyl rubber present in the compound. The term "para-dinitrosobenzene" as used herein and in the claims to define a vulcanizing agent is intended to include the reaction product of para-quinone dioxime and an oxidizing agent such as $Pb_3O_4$ which may be added separately to the mixture of butyl rubber and polybutene and reacted in situ therein. This reaction is described in an article by P. J. Flory and J. Rehner, volume 38, page 500 of Industrial Engineering Chemistry (1946). The para-dinitrosobenzene may be made up of a mixture of 25 percent by weight para-dinitrosobenzene and 75 percent by weight inert wax or clay. Such a mixture is commercially available from E. I. du Pont under the trade name "Polyac."

Numerous other vulcanizing agents have been employed to vulcanize polybutene-butyl rubber mixtures, but none have produced a product conforming to the critical specifications of the sealing compound for the particular multiple glazed unit. For example, sulphur or sulphur liberating vulcanizers common to the rubber industry have been employed but were found to be unsatisfactory due to the blooming of the sulphur from the compound and the formation of a haze on the interior surfaces of the sheets of glass forming the unit. The haze or scum produced on the inner surfaces of the glass sheets results from the precipitation of crystals of sulphur on the surfaces of the glass. The sulphur vulcanized mixtures of polybutene and butyl rubber are satisfactory for glazing applications where blooming is not objectionable. The amount of sulphur or sulphur liberating vulcanizing agent employed in compounds for other glazing purposes, such as in a glazing tape, varies from about 0.5 to 10 percent by weight based upon the weight of the butyl rubber. The combination of para-dinitrosobenzene and sulphur as vulcanizing agents for a glazing tape has been found to provide increased resistance to weathering, particularly increased resistance to flowing caused by exposure to ultraviolet light, to the glazing tape. The same amount of para-dinitrosobenzene is employed as described above and approximately ½ to 4 parts by weight of sulphur to 1 part by weight of active para-dinitrosobenzene is employed to obtain these improved weathering characteristics.

Figure 3:
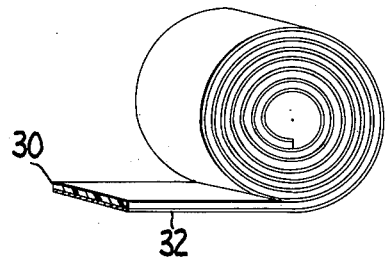
Fig. 3 is an isometric view of a roll of a pressure-sensitive, adhesive, glazing tape.

Other non-sulphur vulcanizing agents have been tried in combination with the polybutene-butyl rubber mixtures described above, but have been found to be unsatisfactory for use in the double glazed unit as described because they did not give satisfactory flow properties to the compound. For example, para,para-dibenzoylquinone dioxime and red lead oxide when used as a vulcanizing agent for the mixture reduced the cold flow properties of the mixture so as to make them satisfactory as glazing compounds, but did not reduce the cold flow properties sufficiently to maintain the 0.001 inch thickness required between the glass sheets 12 and 14 and spacer element 16 when they are subjected to the pressure exerted by the channel member 28. These other vulcanized mixtures of polybutene-butyl rubber, however, do have sufficient tack, tensile strength and moisture and vapor impermeability to permit their use as a pressure-sensitive glazing tape such as shown in Fig. 3. The tape in Fig. 3 is composed of an elongated strip 30 of the vulcanized butyl rubber-polybutene compound which has been extruded onto a paper backing strip 32. The paper strip is treated with a suitable release agent which permits the paper to be readily stripped from the compound 30. It is conventional practice in working with a butyl rubber containing compound to employ a small amount, about 1 to 15 percent by weight of the compound, of zinc oxide to aid in the "mixability" of the mixture and to increase the resistance of the compound to deterioration upon exposure to ultraviolet radiation. While not an essential part of the sealing compound, it has been included therein for these desirable effects. Obviously, an excessive amount of zinc oxide should be avoided because of the deleterious effects upon the adhesiveness and moisture penetration resistance of the compound.

In order for the sealing and glazing compound to have a more pleasing and uniform appearance, it has been found desirable to incorporate therein small amounts of carbon black. The compound may contain up to about 40 percent by weight of carbon black based on the weight of the compound for sealing uses other than in this particular multiple glazed unit. Smaller amounts of the order of 1 to 20 percent by weight of carbon black based on the weight of the sealing compound are usually employed in the sealer for the multiple glazed unit. The carbon black also serves to stabilize the sealing compound with respect to polymeric degradation caused by exposure to ultraviolet light and serves as a reinforcing agent.

Compounding the sealing and glazing compounds of the present invention can be accomplished readily on a conventional two-roll rubber mill. The butyl rubber, polybutene, zinc oxide and carbon black are milled together using conventional milling techniques until substantially homogeneous. Thereafter the vulcanizing agent is added to the mixture and milled therein at a temperature and for a time sufficient to obtain vulcanization of the butyl rubber while the materials are still on the mill, thus eliminating a separate curing operation. Other milling procedures and techniques may be employed to mix the compound. For example, a Baker-Perkins churn type mixer equipped with dispersion blades and a floating ram or a Banbury type mixer may be used.

The butyl rubber is added first to the mixer. The polybutene and other additives such as carbon black and zinc oxide are then mixed in thoroughly according to conventional mixing techniques for the particular mixer. The mixture should be cooled if necessary to a temperature below about 225° F. before the vulcanizing agent is added so that the agent can be thoroughly dispersed before vulcanization begins. After the vulcanizing agent is thoroughly dispersed, the temperature of the compound is raised by the mixing action to a temperature which is sufficient for vulcanization of the compound and the mixing is continued at this temperature until the vulcanization reaction is complete. It is possible to cure small amounts of the mixture under static conditions; however, where large amounts, i.e. in excess of 10 pounds of sealing compound, are to be manufactured, it is preferred that the vulcanization be completed on the mill or in the mixer.

If it is desired, the several ingredients of these new sealing compounds may be admixed under conditions such that vulcanization of the butyl rubber is not effected immediately, such as by cold milling. These undercured compositions can be more readily extruded into usable shapes and employed in the desired manner. Thereafter, the vulcanization reaction of the butyl rubber may proceed rapidly or slowly to achieve the desired flow properties and increased tensile strength.

My invention is further illustrated by the following examples:

EXAMPLE I

Figure 2:
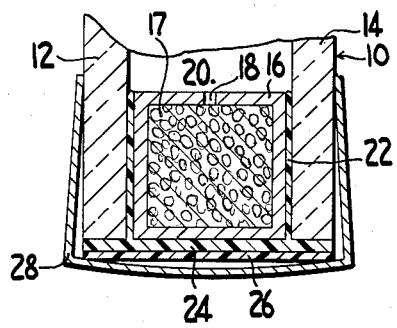
Fig. 2 is a sectional view taken along lines II—II of Fig. 1.

A composition exhibiting optimum physical properties for use in the fabriction of multiple glazed units as illustrated in Figs. 1 and 2 was obtained by combining the following ingredients:

| Component: | Percent by weight |
|---|---|
| Polyisobutylene (Vistanex LM, MS, molecular weight 10.000) | 61.2 |
| Butyl rubber (GR–I, molecular weight 60,000) | 30.6 |
| Zinc oxide | 3.1 |
| Para-dinitrosobenzene (Polyac) | 0.6 |
| Carbon black | 4.5 |

All of the ingredients with the exception of the Polyac were thoroughly milled to a homogeneous mix on a rubber compounding mill. When a homogeneous mix was obtained, the temperature of the mix was lowered to about 200° F. and the Polyac was added. The milling was then conducted at 250° F. for 15 minutes. The vulcanization reaction proceeded readily during the milling and the compound was thereafter easily extruded in both bead and ribbon form. Prolonged exposure to ultraviolet light and temperature changes under accelerated weathering tests over a period of several years did not materially alter the nature of the composition.

The flow characteristics of this compound were uniformly satisfactory. For example, an extruded ribbon, having an original thickness of approximately 0.01 inch, was placed between polished sections of plate glass and aluminum. The joint so obtained was subjected to a pressure of 33 pounds per square inch at 160° F. for 500 hours. The thickness of the ribbon decreased to a minimum of 0.002 inch while its adhesion to both aluminum and glass was retained.

EXAMPLE II

One hundred parts by weight of polyisobutylene having an average molecular weight of about 10,000 were milled with one hundred parts by weight of butyl rubber (GR–I) until a homogeneous mixture was obtained. Approximately 15 parts by weight of carbon black and 10 parts by weight of zinc oxide were added to the mixture and the milling was continued again to homogeneity. There was a final addition of 1 part of para-dinitrosobenzene (Polyac) and additional milling at a temperature of 250° F. until the vulcanization reaction of the butyl rubber was complete. This material exhibited satisfactory properties for use as a sealing compound in multiple glazing units when subjected to the tests of the compound of Example I.

EXAMPLE III

A sealing compound was formulated by the procedure of Example I utilizing a petroleum fraction containing in excess of 90 percent by weight of butene-1, butene-2 and isobutylene polymerized to form a polybutene having a molecular weight of about 1370. Fifty parts by weight of this polybutene (Oronite–64) were mxed with 100 parts by weight of butyl rubber, 5 parts by weight of zinc oxide and 7.5 parts by weight of carbon black to form a homogeneous mixture. Thereafter, 1 part by weight of para-dinitrosobenzene (Polyac) was added to the mix and it was milled further at a temperature of 250° F. until the vulcanization reaction of the butyl rubber was complete. The product thus obtained was suitable for use as a sealing compound in accordance with the practice of this invention.

EXAMPLE IV

Several sealing compounds were made in the manner set above in Example III by substituting 60 parts by weight of polybutenes sold under the trade names of "Indopol H–300" and "Vistac No. 1" for the 50 parts by weight of Oronite-64. Sealing compounds were thereby produced which were satisfactory for use in multiple glazed units as described.

EXAMPLE V

A series of compounds was made to compare the effects of different vulcanizing agents and amount of the various ingredients in the sealing compounds with respect to their tensile strength, elongation at break, tack, hardness and resistance to cold flow. These compounds were made by mixing the butyl rubber, zinc oxide, carbon black and polybutene on a conventional two-roll rubber compounding mill which was maintained at a temperature between 150° and 200° F. The materials were added to the mill in the order named and after each ingredient was added, the mixture was stripped from the mill and returned at least six times to insure complete and uniform mixing of the ingredients. The vulcanizing agent was then added to the mixed ingredients, mixed thoroughly therein, and thereafter the mill was allowed to heat up to a temperature sufficient to permit the vulcanization reaction to take place. The milling was then continued at this temperature for a time sufficient to permit completion of the vulcanization reaction.

In order to determine when the vulcanization reaction was complete, a watt meter was connected with the mill and the power required to turn the mill rolls was recorded. When the reading on the watt meter reached a maximum and started to descend, the vulcanization reaction was considered to be complete. At this time the compound was removed from the mill and placed in a 2½ inch National Rubber Machinery Company Mil-X-Truder designed for extruding vulcanized rubber stock. The compound was extruded in the form of a long bead or strip. The following table lists the ingredients and amounts thereof which were employed to make the various compounds together with the temperatures and times employed during the vulcanization reaction.

percent by weight of isobutylene, butene-1 and butene-2 sold by the Oronite Chemical Company.

The vulcanized strips of materials made according to the above described procedures were conditioned for at least 24 hours at 70° F. and 60 percent relative humidity and tested for their tensile strength, elongation and tack in an Instron tensile testing instrument, Model No. TT-C. The tensile strength was measured by clamping two ends of a strip between jaws on the instrument and moving the jaws apart at a rate of 20 inches per minute so as to exert a pulling force on the test strip. The measurement of the load on the sample at an elongation of 200 percent was taken as the tensile strength of the sample. The tensile strength in pounds per square inch was then calculated for the initial cross-sectional area of the sample. The tack was obtained by projecting a glass rod of ¼ inch diameter against the sample so as to make surface contact and then measuring the force required to pull the rod away from the sample at a rate of 20 inches per minute. This was obtained in terms of grams of force. The hardness was obtained on a ¼ inch wide strip according to the Shore Durometer test (ASTM-D676-49T) for the initial hardness as well as the hardness after 10 seconds penetration into the sample. The test results are listed in the table below. Three tests were made of each sample and the figure listed is the average of the tests. The resistance to cold flow was measured by placing an extruded bead having an original diameter of about 0.01 inch between polished sections of plate glass and aluminum. The joint so obtained was subjected to a pressure

*Table I*

| | 1 | 2 | 3 | 4 | 5 | 6 | 7 | 8 | 9 | 10 | 11 |
|---|---|---|---|---|---|---|---|---|---|---|---|
| 1. Butyl rubber, M.W. 60,000 | 100 | 100 | 100 | 100 | 100 | 100 | 100 | 100 | 100 | 100 | 100 |
| 2. Polyisobutylene, M.W. 12,000 (Oppanol B-12) | 200 | 200 | 200 | 200 | 200 | 100 | | | | 200 | 200 |
| 3. Polybutene (Oronite) | | | | | | | 50 | 50 | 50 | | |
| 4. Zinc Oxide | 10.0 | 25.0 | 25.0 | 10.0 | 10.0 | 10 | 5.0 | 5.0 | 5.0 | 10.0 | 10.0 |
| 5. Carbon black | 15.0 | 60 | 60 | 60.0 | 15.0 | 15 | 7.5 | 50.0 | 100 | 15.0 | 15.0 |
| 6. Para-dinitrosobenzene (Polyac) | 2.0 | 2.0 | | | | 1.0 | 1.0 | 1.0 | 1.0 | | |
| 7. Sulphur | | | | 10 | | | | 0.5 | 0.5 | 2.0 | |
| 8. Butyl zimate | | | | 4 | | | | | | | |
| 9. 2-Mercaptobenzothiazole | | | | | | | | 0.3 | 0.3 | | |
| 10. Paraquinone dioxime | | | 6 | | 6 | | | | | | 0.5 |
| 11. Para, paradibenzoyl quinone | | | | | | | | | | 12.0 | |
| 12. Lead Oxide (Pb₃O₄) | | | 10 | | 10 | | | | | | |
| 13. Lead dioxide | | | | | | | | | | 20 | 1.0 |
| 14. Temperature during vulcanization reaction ° F.) | 250 | 250 | 300 | 250 | 300 | 250 | 275 | 275 | 275 | 275 | 250 |
| 15. Average time for vulcanization reaction (minutes) | 15 | 15 | 3 | 6 | 10 | 4 | 30 | 30 | 50 | 49 | 2.5 |

In the table, the Oronite polybutene was formed of 42 parts by weight of Oronite 32 (molecular weight—1200) and 58 parts by weight of Oronite 128 (molecular weight—1500) to form a mixture having an average molecular weight of about 1300. Oronite 32 and Oronite 128 are polymerized, unsaturated 4 carbon atom, hydrocarbon petroleum fractions containing in excess of 90 of approximately 35 pounds per square inch at 140° F. for 48 hours.

The novel compounds of the invention as tested above have a tensile strength of about 5 to 40 pounds per square inch, an elongation of about 1500 to more than 2200 percent, tack of about 8 to 40 grams and an initial hardness of about 5 to 20. The amount of vulcanizing agent or

*Table II*

| | Compound No. | | | | | | | | | | |
|---|---|---|---|---|---|---|---|---|---|---|---|
| | 1 | 2 | 3 | 4 | 5 | 6 | 7 | 8 | 9 | 10 | 11 |
| Tensile strength, pounds per square inch—Initial | 11 | 9 | 8 | 12 | 11 | 15 | 20 | 23 | 24 | 10 | 7 |
| Percent elongation at break | did not break | did not break | 1,500 | did not break | did not break | did not break | did not break | did not break | did not break | did not break | 1,500 |
| Tack (grams) | 20 | 12 | 18 | 13 | 18 | 13 | 11 | 12 | 10 | 13 | 20 |
| Hardness: | | | | | | | | | | | |
| Initial | 12 | 11 | 12 | 12 | 12 | 14 | 15 | 18 | 18 | 11 | 10 |
| At 10 seconds | 6 | 4 | 3 | 4 | 4 | 5 | 7 | 8 | 7 | 3 | 4 |
| Resistance to Cold Flow (final thickness, inches) | 0.002 | 0.001 | 0.0016 | 0.0005 | 0.001 | 0.001 | .0015 | 0.0014 | 0.0016 | 0.0008 | 0.0001 | combination thereof which is employed in the practice of the invention is that amount which is sufficient to produce a compound having the above described properties.

The combination of butyl rubber and polybutene of the molecular weights described and in the proportions described provides a compound which can be vulcanized and then extruded into strip form for use as a pressure-sensitive, moisture and vapor impermeable sealer or glazing strip. These vulcanized compounds have resistance to cold flow and withstand severe weathering conditions. The use of para-dinitrosobenzene as the active vulcanizing agent in the formulation of the polybutene and butyl rubber has enabled the production of pressure-sensitive, adhesive sealing compounds possessing the required flow properties, nonblooming characteristics and moisture and vapor impermeability for use in the manufacture of a multiple glazed unit of the type described above. These multiple glazed units employing sealing compounds vulcanized by para-dinitrosobenzene have exhibited acceptable performance for periods upwards of eight years. This is far superior to other compounds commonly used in the multiple glazing art.

Although the present invention has been described with respect to specific details of certain embodiments thereof, it is not intended that such details act as limitations upon the scope of the invention except insofar as included in the accompanying claims.

This application is a continuation-in-part of my co-pending application Serial No. 463,770, filed October 21, 1954, now forfeited, which is a continuation-in-part of my application Serial No. 301,160, filed July 26, 1952, now abandoned.

I claim:

1. A multiple glazed unit comprising a plurality of glass sheets, a spacer element separating the glass sheets at their marginal edge surfaces, said spacer element having flat surfaces in juxtaposition with the opposing marginal edge surfaces of the glass sheets, a thin film of a moisture and vapor impervious, pressure-sensitive, adhesive material having a minimum thickness of 0.001 inch between and adhering to the flat, juxtaposed surfaces of the spacer element and the glass sheets, said adhesive material consisting essentially of a vulcanized mixture of a polymer of a monoolefin containing four carbon atoms and having a molecular weight of between 300 and 15,000 and a copolymer of a monoolefin containing four carbon atoms and a diolefin containing four to six carbon atoms, said copolymer containing 70 to 99.5 parts by weight of the monoolefin and 30 to 0.5 part by weight of the diolefin and having a molecular weight between 25,000 and 100,000, the polymer being present in an amount equal to 45 to 210 parts by weight to 100 parts by weight of the copolymer, said mixture being vulcanized by para-dinitrosobenzene in the absence of a sulphur-containing compound, and a channel member of U-shaped cross-section affixed around the edges of the glass sheets so as to hold the glass sheets against the adhesive material and the adhesive material against the spacer element, under 10 to 50 pounds per square inch pressure.

2. A multiple glazed unit as described in claim 1 wherein the polymer in the adhesive material is selected from the group consisting of polymers of butene-1, butene-2, and isobutylene and copolymers with each other.

3. A multiple glazed unit as described in claim 1 wherein the polymer in the adhesive material is polyisobutylene.

4. A multiple glazed unit as described in claim 1 wherein the adhesive material also overlaps the outer edges of the glass sheets and the spacer element.

5. A multiple glazed unit as described in claim 1 wherein the adhesive contains from about 1 to 15 percent by weight of zinc oxide based upon the combined weight of said polymer and copolymer and from 1 to 20 percent by weight of carbon black based upon the combined weight of said polymer and copolymer.

6. An article of manufacture which is suitable for use as a hermetic sealing element in a glazing structure which comprises an elongated strip of a tacky, moisture and vapor impervious, pressure-sensitive, adhesive material composed of a vulcanized mixture of a polymer of a monoolefin containing four carbon atoms and having a molecular weight between 300 and 15,000 and a copolymer of a monoolefin containing four carbon atoms and a diolefin containing four to six carbon atoms, said copolymer containing 70 to 99.5 parts by weight of the monoolefin and 30 to 0.5 part by weight of the diolefin and having a molecular weight between 25,000 and 100,000, the polymer being present in an amount equal to 45 to 210 parts by weight to 100 parts by weight of the copolymer.

7. An article of manufacture which is suitable for use as a hermetic sealing element in a glazing structure which comprises an elongated strip of a tacky, moisture and vapor impervious, pressure-sensitive, adhesive material composed of a vulcanized mixture of a polymer of a monoolefin containing four carbon atoms and having a molecular weight between 300 and 15,000 and a copolymer of a monoolefin containing four carbon atoms and a diolefin containing four to six carbon atoms, said copolymer containing 70 to 99.5 parts by weight of the monoolefin and 30 to 0.5 part by weight of the diolefin and having a molecular weight between 25,000 and 100,000, the polymer being present in an amount equal to 45 to 210 parts by weight to 100 parts by weight of the polymer, said mixture having been vulcanized by para-dinitrosobenzene.

8. An article of manufacture which is suitable for use as a hermetic sealing element in a glazing structure which comprises an elongated strip of a tacky, moisture and vapor impervious, pressure-sensitive, adhesive material composed of a vulcanized mixture of a polymer of a monoolefin containing four carbon atoms and having a molecular weight between 300 and 15,000, a copolymer of a monoolefin containing four carbon atoms and a diolefin containing four to six carbon atoms, said copolymer containing 70 to 99.5 parts by weight of the monoolefin and 30 to 0.5 part by weight of the diolefin and having a molecular weight between 25,000 and 100,000, the polymer being present in an amount equal to 45 to 210 parts by weight to 100 parts by weight of the copolymer, from about 1 to 15 percent by weight of zinc oxide based upon the combined weight of said polymer and copolymer and from 1 to 40 percent by weight of carbon black based on the combined weight of said polymer and copolymer.

9. An article of manufacture which is suitable for use as a hermetic sealing element in a glazing structure which comprises an elongated strip of a tacky, moisture and vapor impervious, pressure-sensitive, adhesive material composed of a vulcanized mixture of a polymer of a monoolefin containing four carbon atoms and having a molecular weight between 300 and 15,000, a copolymer of a monoolefin containing four carbon atoms and a diolefin containing four to six carbon atoms, said copolymer containing 70 to 99.5 parts by weight of the monoolefin and 30 to 0.5 part by weight of the diolefin and having a molecular weight between 25,000 and 100,000, the polymer being present in an amount equal to 45 to 210 parts by weight to 100 parts by weight of the copolymer, from about 1 to 15 percent by weight of zinc oxide based upon the combined weight of said polymer and copolymer and from 1 to 40 percent by weight of carbon black based on the combined weight of said polymer and copolymer, said mixture having been vulcanized by para-dinitrosobenzene.

10. An article of manufacture as described in claim 6 wherein the vulcanized mixture has been vulcanized by para-dinitrosobenzene and sulfur.

References Cited in the file of this patent

UNITED STATES PATENTS

| 2,392,847 | Frolich | Jan. 15, 1946 |
| 2,583,387 | Morrissey et al. | Jan. 22, 1952 |
| 2,838,810 | Englehart et al. | June 17, 1958 |
| 2,864,882 | Snell | Dec. 16, 1958 |

UNITED STATES PATENT OFFICE
CERTIFICATE OF CORRECTION

Patent No. 2,974,377            March 14, 1961

Gerald E. Kunkle

It is hereby certified that error appears in the above numbered patent requiring correction and that the said Letters Patent should read as corrected below.

Column 1, line 17, for "application" read -- applications --; column 2, line 67, for "polysibutylene" read -- polyisobutylene --; column 3, line 52, for "poybutene" read -- polybutene --; line 53, for "buty" read -- butyl --; column 5, line 73, for "fabriction" read -- fabrication --; column 6, line 3, for "10.000" read -- 10,000 --; column 7, Table I, Item No. 14, for "°F.)" read -- (°F.) --; column 10, line 37, for "polymer" read -- copolymer --.

Signed and sealed this 28th day of November 1961.

(SEAL)
Attest:

ERNEST W. SWIDER            DAVID L. LADD
Attesting Officer            Commissioner of Patents

USCOMM-DC